US011720392B2

(12) United States Patent
Moore et al.

(10) Patent No.: US 11,720,392 B2
(45) Date of Patent: Aug. 8, 2023

(54) LIVE VIRTUAL MACHINE RELOCATION TO ACCOMMODATE REVERSIBLE RELOCATIONS IN A HETEROGENEOUS CLUSTER OF HYPERVISOR VERSIONS

(71) Applicant: INTERNATIONAL BUSINESS MACHINES CORPORATION, Armonk, NY (US)

(72) Inventors: Richard John Moore, Waterlooville (GB); Damian Osisek, Vestal, NY (US); Tracy Ann Krein, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 17/187,986

(22) Filed: Mar. 1, 2021

(65) Prior Publication Data
US 2022/0276888 A1    Sep. 1, 2022

(51) Int. Cl.
*G06F 9/455* (2018.01)
*G06F 9/50* (2006.01)
*G06F 21/60* (2013.01)

(52) U.S. Cl.
CPC ........ *G06F 9/45558* (2013.01); *G06F 9/5077* (2013.01); *G06F 21/602* (2013.01); *G06F 2009/4557* (2013.01); *G06F 2009/45587* (2013.01); *G06F 2009/45595* (2013.01)

(58) Field of Classification Search
CPC .................................................. G06F 9/45558
USPC .......................................................... 718/1
See application file for complete search history.

(56) References Cited

U.S. PATENT DOCUMENTS

| 7,657,663 | B2* | 2/2010 | Freimuth | G06F 13/4022 |
| | | | | 710/5 |
| 7,836,238 | B2 | 11/2010 | Freimuth | |
| 9,418,220 | B1* | 8/2016 | McKee | G06F 21/602 |
| 10,754,680 | B2* | 8/2020 | El-Moussa | G06F 21/53 |
| 2011/0004878 | A1* | 1/2011 | Divoux | G06F 9/4856 |
| | | | | 718/1 |
| 2012/0284709 | A1* | 11/2012 | Lorenc | G06F 9/455 |
| | | | | 718/1 |
| 2013/0042241 | A1* | 2/2013 | Lorenc | G06F 9/45558 |
| | | | | 718/1 |
| 2016/0350150 | A1* | 12/2016 | Marquardt | G06F 9/45558 |
| 2018/0103018 | A1* | 4/2018 | Chauhan | H04L 63/0485 |
| 2019/0068557 | A1* | 2/2019 | Noel | G06F 21/602 |
| 2021/0019172 | A1* | 1/2021 | Patel | G06F 21/53 |

(Continued)

OTHER PUBLICATIONS

Grace Period Disclosure: "Mixed-APVIRT LGR," z/VM Continuous Delivery News, [Announcement] Feb. 4, 2021, 31 Pages.

*Primary Examiner* — Mehran Kamran
(74) *Attorney, Agent, or Firm* — Teddi E. Maranzano

(57) ABSTRACT

Dynamic relocation of virtual machines among hypervisors in a relocation domain is provided. A hypervisor is initialized in a subdomain of the relocation domain. A record of architecture characteristics is retrieved for each hypervisor in the relocation domain. A new canonical architectural description (ARD) is created for each subdomain in the relocation domain. An effective adapter characteristic representation is created for each virtual machine defined to the hypervisor. The record of architecture characteristics for each hypervisor in the relocation domain is updated.

17 Claims, 8 Drawing Sheets

(56) References Cited

U.S. PATENT DOCUMENTS

| | | | |
|---|---|---|---|
| 2022/0276888 A1* | 9/2022 | Moore | G06F 21/602 |
| 2023/0131198 A1* | 4/2023 | Gomes | G06F 21/6236 726/26 |

* cited by examiner

US 11,720,392 B2

LIVE VIRTUAL MACHINE RELOCATION TO ACCOMMODATE REVERSIBLE RELOCATIONS IN A HETEROGENEOUS CLUSTER OF HYPERVISOR VERSIONS

BACKGROUND

Aspects of the present invention have been disclosed by the Applicant, who obtained the subject matter disclosed directly from the inventors, in the product IBM z/VM 7.2, made available to the public on Feb. 4, 2021.

The present invention relates to dynamic virtual machine domain configuration and specifically to virtual machine relocation in heterogeneous clusters of hypervisor versions.

Live virtual machine relocation provides a mechanism for permitting virtual machines to relocate non-disruptively among a cluster of hypervisors, which need not be co-located on the same physical hardware. The hypervisors may be at different functional levels, and the architecture of the machines on which they run may be functionally non-identical. Furthermore, the set of machines among which a virtual machine may relocate (the relocation domain) presents a maximal common subset of machine and hypervisor facilities such that it is unnecessary for a system administrator to explicitly specify particular characteristics to be exposed to a virtual machine; and not have to confine the participating machine and hypervisor combinations to be pre-selected for compatibility.

When a virtual machine is executing on hardware with different architectural capabilities, or on hypervisors with differing levels of functionality, it can be problematic for the virtual machine to move from one system to another. If the virtual machine is first started on a system with more capabilities than another system to which it could be relocated, the virtual machine could lose access to facilities it has been using when it is relocated. This result is particularly concerning when differing cryptographic capabilities of the physical machines in the relocation domain affect virtual machine mobility. Therefore, it would be advantageous to calculate optimal common cryptographic architecture (CCA) and Accelerator-based cryptographic capabilities for the Relocation Domains to facilitate virtual machine mobility.

SUMMARY

A method for dynamic relocation of virtual machines among hypervisors in a relocation domain is provided. The method includes initializing a hypervisor in a subdomain of the relocation domain. A record of architecture characteristics is retrieved for each hypervisor in the relocation domain. A new canonical architectural description (ARD) is calculated for each subdomain in the relocation domain. An effective adapter characteristic representation is calculated for each virtual machine (VM) defined to the hypervisor. The record of architecture characteristics is updated for each hypervisor in the relocation domain.

Embodiments are further directed to computer systems and computer program products having substantially the same features as the above-described computer-implemented method.

Yet another embodiment includes a method for a reverse transition of a VM to a hypervisor having an older level than that of the hypervisor hosting the VM. The effective cryptographic characteristics of the VM are compared to the pool of shared cryptographic resources at the destination hypervisor. Based on the VM having a legacy indicator, the reverse transition is performed if the effective cryptographic characteristics of the VM are identical to the pool of shared cryptographic resources at the destination hypervisor.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A cluster of hypervisors (systems) is established to provide physical machine capabilities to one or more virtual machines (VM). The cluster is divided into relocation domains (domains), with each domain including one or more hypervisors from the cluster, and each hypervisor belonging non-exclusively to one or more domains. Each domain is further divided into a cryptographic subdomain having Cryptographic Express PCIe (CEX) adapters configured in Common Cryptographic Architecture (CCA) mode, (CEXC), and a cryptographic subdomain having CEX adapters configured in Accelerator (CEXA) mode. A single hypervisor may belong to more than one domain, but not to more than one subdomain within a domain. Each of the hypervisors executes on a computer, and has available to it all of the functions and facilities (also referred to herein collectively as "resources") available from the computer on which it is executing. The resources include software instructions, machine code instructions, microcode instructions, and/or physical hardware capabilities. The domains provide a set of the resources that the domain hypervisors expose to VMs, and provide a mechanism for ensuring that any virtual machine relocation occurs in a controlled and predictable manner.

Embodiments of the present invention may be implemented on computer hardware and software that supports live VM relocation with VMs that include cryptographic adapters. However, the contexts of z/VM® and z/Architecture® are used to facilitate understanding of the elements of the present invention. (z/VM® and z/Architecture® are registered trademarks of IBM in the United States).

Figure 1:
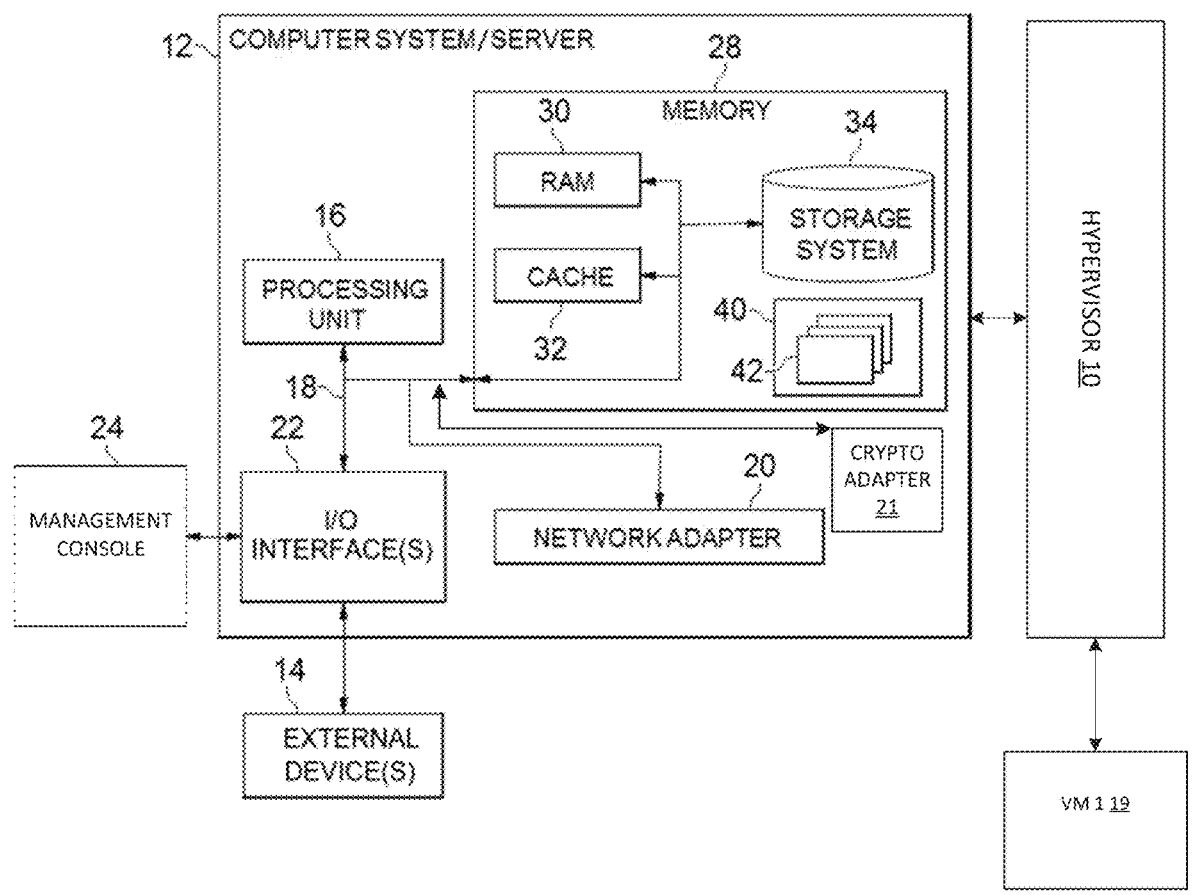
FIG. 1 is a functional block diagram of an illustrative system, according to an embodiment of the present invention.

Although the present invention was described with respect to cryptographic capabilities, it could readily be applied to other capabilities of the computing system configured separately from the processing unit 16 of FIG. 1, such as graphics processing units, neural network processing units, or other components. Different types or operational modes of these units could be represented through different subdomains of a relocation domain, so that nondisruptive relocation can be ensured between hypervisors that have compatible forms of these additional capabilities, for guests configured with the corresponding virtual capabilities.

Live guest relocation (LGR), as implemented in the z/VM® hypervisor, provides a mechanism for permitting VMs to be relocated non-disruptively among a cluster of z/VM® hypervisors, which need not be co-located on the same physical hardware. The hypervisors may be at different functional levels and the z/Architecture® machines on which they run may be functionally non-identical. Furthermore, the set of machines among which a VM may relocate (the relocation domain) presents a maximal common subset of machine and hypervisor facilities such that it is unnecessary for a system administrator to explicitly specify particular characteristics to be exposed to a VM; and not have to confine the participating machine and hypervisor combinations to be pre-selected for compatibility.

The hypervisors participating in the cluster of machines that provide LGR, known as the Single System Image (SSI), share machine and functional characteristics with each other via an external data set that includes a record of architecture characteristics for each hypervisor in the relocation domain. This external data set may be referred to as a persistent data record (PDR).

Subsets of the SSI and VMs are assigned to relocation domains (RD). A machine/hypervisor may participate in more than one RD. The RD defines the set of systems among which the assigned VMs may relocate.

The members of the SSI collectively share their individual characteristics, such as the aforementioned resources, and domain membership definitions. From these they independently calculate the optimal set of machine and hypervisor functional characteristics for each relocation domain. These characteristics are recorded in an Architecture Description (ARD). The ARD comprises resource bit strings indicating the available resources, scalar quantities, which indicate the amount of available resource capacity, and labels to indicate the names of resources, virtual machine models, and other hypervisor information as is known in the art. The ARD may include an ARD version number and self-defining sub-structures. A primary or canonical ARD is calculated for each RD. The ARD is written to a common disk area that is available to all hypervisors in the cluster. Each VM is associated with an RD and an ARD. The domain hypervisors and the LGR facility cooperate to create the SSI, RD, and ARD. The ARD for an RD that contains more than one member is calculated as the intersection of the ARDs of all members of the domain. This intersection represents the "maximal common subset" of facilities that are available to a virtual machine assigned to that domain.

As implemented in technology prior to embodiments of the present invention, when the constituents of an RD change, either through changes in membership or dynamic upgrade, then some characteristics may become common to all members, while others may cease to be common to all members. This necessitates the canonical ARDs for each domain to be recalculated. If the new canonical ARD results in the loss of some capability because a machine of lower capability is added to the RD, then the existing canonical ARD is demoted to that of a variant ARD with the new canonical ARD taking its place. Virtual machines connected to the old canonical ARD now have the variant ARD assigned which has the same or a superset of the previous ARD to which they were connected. The member that caused the loss of capability is excluded from the candidate list of destination systems to which they are able to relocate. New VMs logging on after the domain change will be assigned the canonical ARD and thus enjoy full relocation rights. If the new canonical ARD results in the addition of facilities across the relocation domain, then those new facilities are reflected in all ARDs—canonical and variants for the relocation domain. Only when facilities are removed might variants created. These two effects may be combined when changes cause some facilities to become common throughout the relocation domain while others cease to be common.

Continuing with implementations prior to embodiments of the present invention, relocating a VM out of its assigned RD may cause the relocation to a hypervisor that has different architectural capabilities than that of its assigned domain. In this case, the canonical ARD currently in use by the VM is compared to the singleton ARD of the destination hypervisor to determine compatibility. If the destination's ARD is equal to or a superset of the VM's current ARD, then the relocation is allowed. Relocation to a hypervisor with a subset of the VM's current ARD is allowed only if an explicit force option is specified manually. It then becomes the administrator's responsibility to ensure that the software and hardware in the VM is not relying on the unavailable features, or to accept the consequences (e.g., failure of one or more applications within the VM, or reversion from a hardware-exploitive to a software algorithm).

The functionality of a z/Architecture® CPU may be supplemented by additional plug-in resources such as the cryptographic adapters. The cryptographic adapters may be configured in different modes of operation, each offering an entirely different set of capabilities. Furthermore, cryptographic adapters may be dynamically taken offline, reconfigured and brought back online, without the need for the hypervisor to be restarted. Within each mode of operation, the cryptographic adapters may be operating at differing functional levels depending on the version of firmware loaded and generation of hardware employed by the cryptographic adapter.

Under the existing LGR arrangements, the characteristics of one or of a pool of cryptographic adapters of a consistent mode and type may be assigned to a hypervisor and their characteristics be augmented into the ARD. However the differing operational modes; the possibility that a z/Architecture® CPU could initialize without any cryptographic adapters; the possibility that the cryptographic adapter may appear configured online some time after the hypervisor has initialized; and the fact that the cryptographic adapter modes of operation (i.e., CEXC or CEXA) can change dynamically have resulted in a limited accommodation of cryptographic adapters by LGR. Today, the VM operating systems that are authorized to use cryptographic adapters may only relocate if the cryptographic adapter characteristics present at the destination system are identical. The cryptographic adapter characteristics have essentially been managed independently of the ARD by using relocation-time eligibility checks, where the source and destination systems participate in a compatibility assessment.

A particular consequence and difficulty with the current arrangement is that administrators who wish to install a new model of z/Architecture® processor, which is typically furnished with new models of cryptographic adapter, will find that LGR does not permit a managed inclusion of the new system into the RD, nor a managed migration of VMs and workloads to the new z/Architecture® processor, because of the restrictive eligibility checks. Furthermore, if forward compatibility were recognized at relocation time, then a VM that did successfully migrate from an old system to a newer system with later types of cryptographic adapters would not be permitted to make the reverse relocation because the VMs have been exposed potentially to a higher level of cryptographic adapter functionality.

To address the foregoing issues, LGR is modified to allow shared use cryptographic adapters to be integrated into the LGR facility management schemes. In particular the managed transition from older systems to newer systems is supported, as is reverse relocation. Furthermore, non-cryptographic VMs are unaffected by cryptographic content of their assigned relocation domain until they become dynamically authorized to use cryptographic facilities. This means that non-cryptographic VMs may relocate freely to any hypervisor in their RD.

The definition of an RD is extended to include information on shared cryptographic adapter characteristics. The existing LGR facility is extended to calculate the common cryptographic capabilities shared by each RD.

Noting that the cryptographic capabilities of any physical machine may dynamically change from one configuration mode to another, i.e., from CCA mode to Accelerator mode, a separate cryptographic subdomain is defined for each mode of cryptographic adapter. Other cryptographic subdomains may be defined to support other types of cryptographic cards or other configuration modes.

The ARD calculations are applied to the corresponding cryptographic subdomains to determine common characteristics, as is done in the LGR prior to this invention. For example, facilities represented by a bit string are subject to a bit-wise AND, with version information represented by monotonically increasing numbers are subject to taking the minimum version. These operations are applied among Accelerator cryptographic subdomains and separately applied among CCA cryptographic subdomains. The resulting ARD will contain Accelerator and CCA cryptographic subdomains each representing common capabilities among the constituent members of the subdomain.

Furthermore, noting that a physical system may be temporarily without any cryptographic capability or, if that capability is defined then it might only be defined for one or the other configuration modes, then the process of forming a common cryptographic view for the domain is further modified. Should the cryptographic adapter characteristics for a mode in a member be null, i.e. that mode is not configured in any of the attached adapters, then the null configuration is ignored in arriving at the calculation of the canonical ARD for the relocation domain. Thus the calculation of common subdomain characteristics is made from the collective non-null (i.e., non-trivial) subdomains of each cryptographic mode of each member system of a RD.

At system initialization time, when the current system characteristics are assessed, and also whenever the characteristics for a member system change, a description of the latest characteristics is stored in a shared data set, the PDR. Therefore, each member system of the SSI is able to share its characteristics with every other one.

A cryptographic subdomain description is not updated if is currently null. This means that the PDR will contain the last known non-trivial characteristics for each cryptographic subdomain of each member. It will permit each system to form an expected view of a member's subdomain even if that subdomain is currently not configured. This permits the delayed initialization of cryptographic adapters which tends to reduce the likelihood of another system forming either an overly optimistic or pessimistic view the cryptographic characteristics of the system that is yet to initialize its cryptographic adapters. Relocations to newly installed systems are supported because the LGR ARD and RD manipulations allow a common view of the cryptographic characteristics to be formed.

To be consistent with existing LGR principles for managing processor features, the addition to the domain of a superior model of processor and cryptographic adapter will result in no alteration to the subdomain characteristics presented to the VM. At relocation time the LGR facility performs eligibility checks against the VM's current cryptographic adapter characteristics, as derived from the ARD, against the actual characteristics in use at the destination system. In the new system upgrade case the existing capability is compared with a superior capability, and relocation to the new system would be permitted.

In order to support a reverse transition, the cryptographic subdomain information is referenced when the VM initializes or re-initializes its virtual cryptographic device(s). Thereafter, the VM retains this as its effective cryptographic adapter characteristics. These remain with the VM as it relocates around the domain. Thus at relocation time a VM's effective cryptographic adapter characteristics are validated for compatibility with the destination system. The effective cryptographic adapter characteristics for a VM need only be recalculated when a local configuration change (at the system where the VM is running) is necessarily forced on the VM. This is because a hypervisor implements one mode of shared pool of cryptographic adapter resources, i.e., all Accelerator or all CCA coprocessor. The two modes are mutually exclusive from a programming perspective. If a virtual cryptographic resource, which is presented to the VM, is backed by a set of real resources managed by the hypervisor, the VMs must all share common characteristics. Among the membership of a relocation domain some VMs will be providing virtual CCA mode adapters and some virtual Accelerator mode adapters. Therefore, each of the subdomains present the common CCA mode view and similarly the common Accelerator mode view. If a given hypervisor reconfigures its real resources and in so doing removes them altogether, and substitutes less capable resources or switches to a different mode of resource (CCA ↔Accel) then the hypervisor cannot continue to provide the same type of virtual resource for the VM. A change is consequently forced on the guest VM. As a precaution, such changes are not allowed without confirmation because they are disruptive to the VM. However, the present invention provides the option of relocating such VMs to another member in the of same subdomain prior to reconfiguring the current system.

Another issue regarding reverse transition is how to accommodate members of the cluster where some hypervisors are at an older level than that of the hypervisor level that incorporates the embodiments of the present invention. These legacy hypervisors only permit VMs to relocate there if the in-bound VM has identical effective cryptographic adapter characteristics to those of the destination system's pool of shared cryptographic resources. In this case, VMs that relocate from legacy hypervisors might not be able to make the reverse transition. This is because legacy-to-current relocations are subject to the new compatibility rules, whereas the legacy hypervisors require identical cryptographic characteristics to those provided by the legacy hypervisor. The SSI cannot use any subdomain information from the legacy systems. It is therefore possible for VMs coming from a legacy hypervisor to have their effective characteristics enhanced to those of the subdomain, but doing so makes them no longer identical to the originating system. However, this is resolved by attaching a legacy indicator to the relocated VM. This indicator is used to inhibit changes to that virtual guest's effective characteristics.

Whenever CPU characteristics change for a given system, recalculation of all ARDs of all domains to which this system belongs is performed. The same is true if the system's local cryptographic adapter configuration were to change in a non-trivial way (other than null). The ARDs are not changed when the local system's cryptographic adapter configuration becomes null. This is to prevent factoring in domain facilities null cryptographic characteristics. Doing so would leave no cryptographic capability within an RD. In contrast, if a CPU within the RD does not possess a facility then that facility (in general) is not presented to any virtual guest in the RD no matter what physical system the virtual guests are running on.

Because the cryptographic subdomain is not referenced by non-cryptographic VMs, there is no need to create variant ARDs, as is done in the LGR facility prior to this invention, in response to domain membership and capability changes through upgrade (and downgrade). Accordingly, the existing LGR process is modified to recognize architecture changes by eliminating comparisons of the cryptographic subdomains. However, variants ARDs will still be created for incompatible CPU changes. If a change occurs, which is solely due to a change in a cryptographic subdomain, then the optimal view of the cryptographic subdomain is recalculated and the subdomain content is updated when non-trivial. In this context, non-trivial refers to a non-null configuration, i.e., a configuration having one or more real resources to back the pool of resources from which virtual resources for virtual guests are created.

Managing cryptographic subdomain updates this way affords a major saving in processing efficiency. The existing process needed to update the ARD, in general, requires that each VM connected to an ARD be forced into an operational synchronization point, which in this embodiment is referred to as Console Function Mode (CFM). Embodiments of the present invention avoid the need for CFM as long as a block-concurrent method of referencing information held by the cryptographic subdomain is used. Transactional memory or transactional execution is one established method for achieving this.

FIG. 1 is a functional block diagram of an illustrative virtualized environment (system) 100, according to an embodiment of the invention.

As shown, the system 100 includes one or more computer system/servers (server) 12, one of which is shown. The server 12 may include any computer capable of including a hypervisor 10, which enables virtualizing the server 12 hardware to support one or more optional virtual guests, such as VM1 19.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, and may enable creation of multiple VMs, when a hypervisor 10 is installed on the server 12.

As shown in FIG. 1, the server 12 may include, but is not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 (one of which is shown) represents one of a plurality of programs that are stored in the storage system 34 and are loaded into the memory 28 for execution. A program 40 includes an instance of an operating system, an application, a system utility, or similar. Each program 40 includes one or more modules 42. Upon activation of the VMs, the hypervisor 10 can cause the profiles of the various VMs to load into hypervisor 10 memory, where they populate the configuration parameters and resources of the VMs. It should be noted that even when the server 12 includes the hypervisor 10, a VM is not required. In that case, the physical resources of the server 12 are not virtualized.

The server 12 may also communicate with one or more external devices 14 such as a keyboard, a pointing device; and/or any devices (e.g., network card, modem, etc.) that enable the server 12 to communicate with one or more other computing devices. Such communication can occur via Input/Output (I/O) interfaces 22.

The management console 24 includes specialized software to communicate with the hypervisor 10 component of the server 12 through the I/O interface 22 to manage the configuration and state of VMs. Using the management console 24 an administrator having the appropriate security authorization defines and modifies VMs, assigns servers to domains and subdomains, and assigns hardware, particularly cryptographic adapters (21) to servers and VMs.

The server 12 can communicate with one or more networks via network adapter 20. As depicted, network adapter 20 communicates with the other components of the server 12 via bus 18. Although not shown, other hardware and/or software components could be used in conjunction with the server 12. Examples include, but are not limited to: microcode, device drivers, redundant processing units, external disk drive arrays, RAID systems, tape drives, and data archival storage systems. In the present invention, the server 12 can illustrate a physical hardware and software implementation. The server 12 can also illustrate a virtual implementation of a physical server, for example, a VM.

It will be understood that the dynamic VM domain configuration and VM relocation management described in FIG. 1 may be implemented in hardware, software, or a combination thereof.

Figure 2:
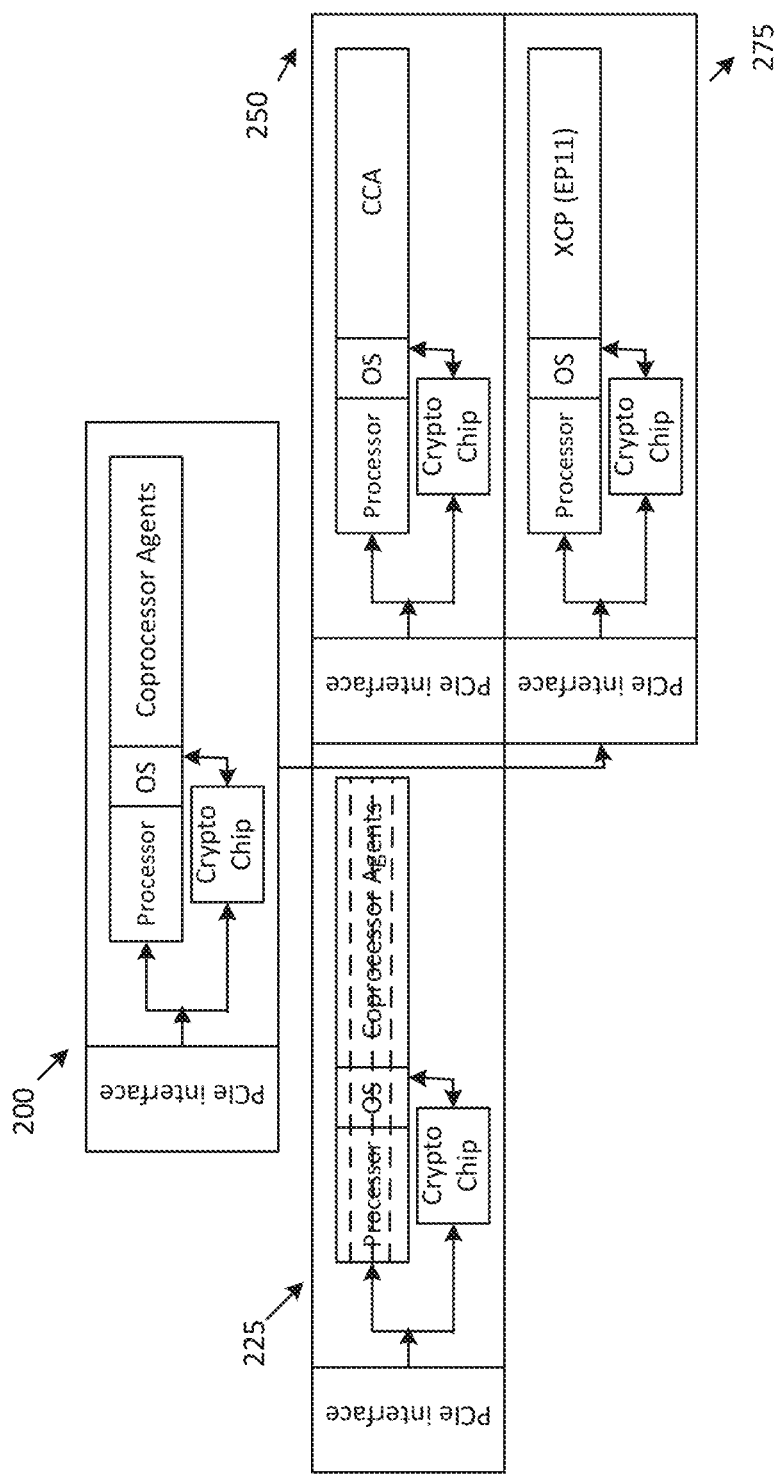
FIG. 2 illustrates a PCIe cryptographic express adapter card, according to an embodiment of the present invention.

FIG. 2 illustrates a PCIe cryptographic express (CEX) adapter card 200, according to an embodiment of the present invention.

The CEX adapter comprises a PCIe interface from which in-bound work is directed to various capabilities present in the adapter. The CEX adapter also includes an FPGA cryptographic chip for high-speed PKU encryption and decryption operations. A processor chip runs a specially customized operating system, preferably Linux, to control the operations of the CEX adapter. Linux applications, known as coprocessor agents, include EP11 (aka XCP) that provides an encryption capability conforming to IBM's implementation of the PCKS #11 programming standard, and the Common Cryptographic Architecture (CCA) agent that provides clear-key and protected key services used by the Linux cryptographic libraries.

The CEX adapter may be configured in one of three mutually exclusive modes, which have no commonality from a programming perspective and are therefore considered radically different entities for LGR purposes. It should be noted that EP11 is included for the comprehensive description of the CEX adapter. However, EP11 is not included in the present implementation which focuses on the subset of cryptographic operations known as clear-key operation. Clear-key operations may be performed by CEX adapters configured in CCA or Accelerator mode however EP11 only operates in a secure key mode.

Direct access mode, 225, to the FPGA cryptographic chip is provided in Accelerator mode. Requests are issued using a cryptographic request structure appropriate to the architectural implementation.

In CCA coprocessor mode, 250, the CCA agent is active and provides the functionality of the CEX adapter. Normal requests are sent using a cryptographic request structure.

In EP11 coprocessor mode, 275, the EP11 agent is active and provides the functionality of the CEX adapter.

Figure 3:
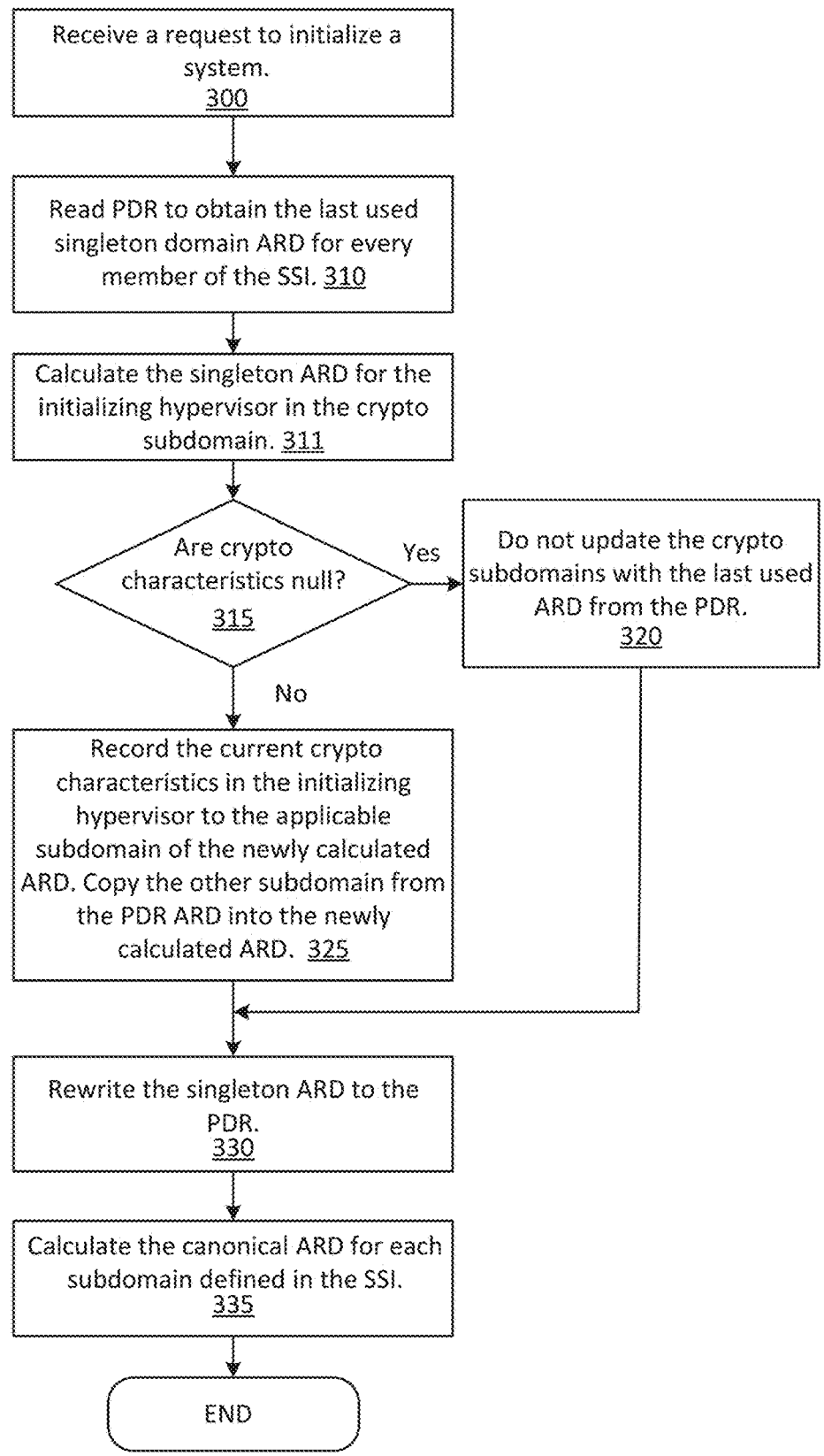
FIG. 3 illustrates a flow chart of initializing a system in a relocation domain, according to an embodiment of the present invention.

FIG. 3 illustrates a flow chart of initializing a system in a relocation domain, according to embodiments of the present invention. The process flow of FIG. 3 may be executed by a hypervisor, the LGR facility, or a combination of the two.

At 300, a hypervisor receives a request to initialize, for example, through a message from a management module.

At 310, each hypervisor in the RD reads the PDR to retrieve the last used singleton domain ARD for each member of the SSI. At 311, the singleton ARD for the initializing hypervisor in the cryptographic subdomain is calculated. At 315, it is determined whether the cryptographic characteristics of a member hypervisor are null.

If so, then at 320 the null configuration is ignored in arriving at the calculation of the canonical ARD for the relocation domain. Do not update the cryptographic subdomains with the last used ARD read from the PDR. Processing continues at 330. This ensures that non-cryptographic characteristics (e.g., basic CPU facilities) are updated in this hypervisor's record in the PDR, even if the cryptographic characteristics are null. Thus the calculation of common subdomain characteristics is made from the collective non-null (i.e., non-trivial) subdomains of each cryptographic mode of each member system of a RD.

If at 315 the cryptographic characteristics are not null, then at 325 a new canonical ARD is calculated for each subdomain. This is done by recording the current cryptographic characteristics in the initializing hypervisor to the applicable subdomain of the newly calculated ARD. Then, copy the other subdomain from the PDR ARD into the newly calculated ARD. This ensures the newly calculated ARD has the last known/used cryptographic characteristics of each of the subdomains the hypervisor participated in. If the hypervisor never participated in one or other of the cryptographic subdomains, then the corresponding subdomain definition within the ARD will be null.

At 330, the singleton ARD for the initializing system is re-written to the PDR. This ensures other systems will know about the latest CPU and cryptographic characteristics for each subdomain that is configured.

At 335, the canonical ARD for each subdomain defined in the SSI is calculated. The characteristics included in the canonical ARD include cryptographic key lengths, whether the cryptographic adapter card supports only clear key operations or is full state, and the configuration mode, i.e., CCA or Accelerator.

Figure 4:
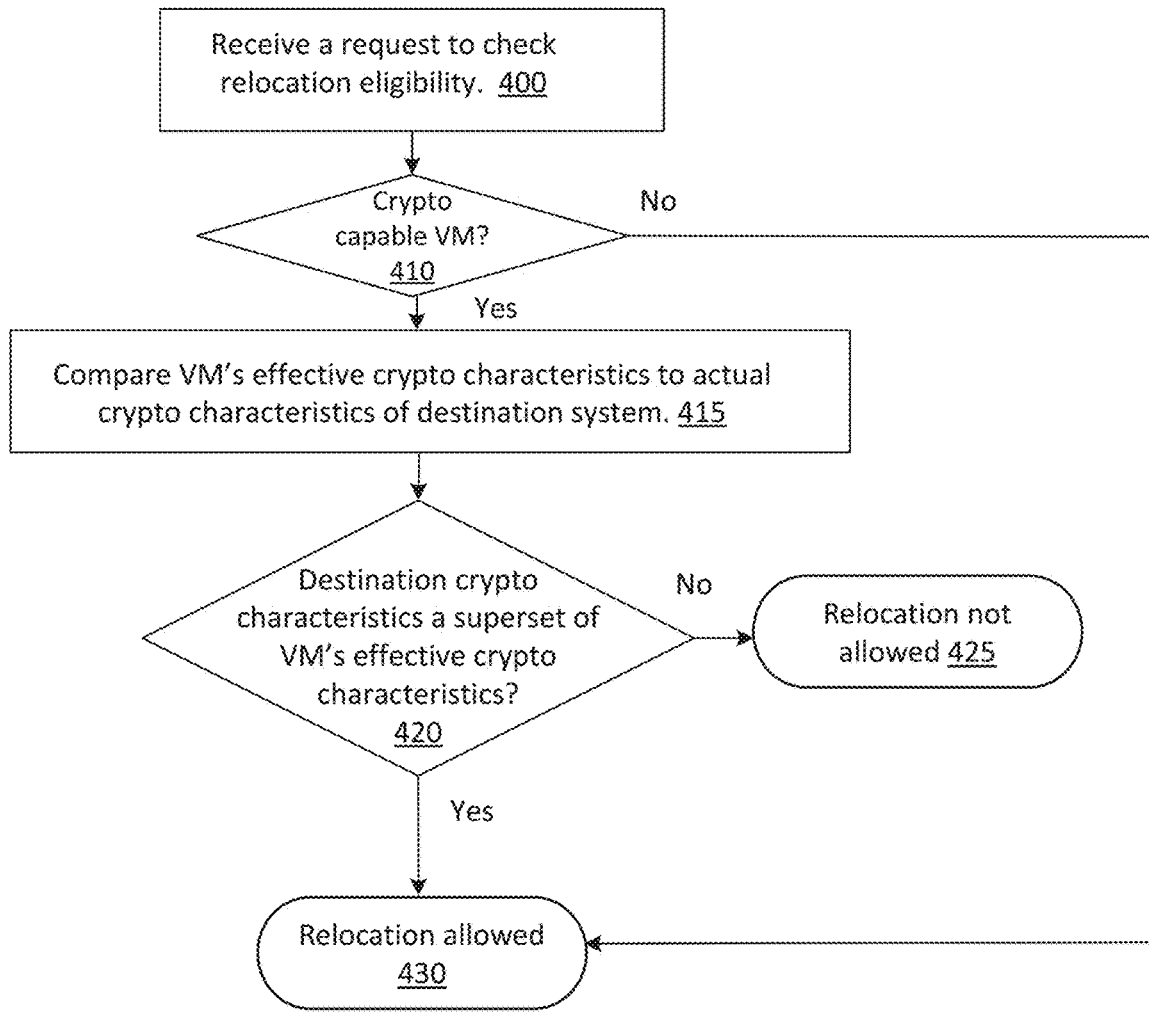
FIG. 4 illustrates a flow chart of relocating a virtual machine (VM), according to an embodiment of the present invention.

FIG. 4 illustrates a flow chart of performing relocation eligibility checks for a VM within a RD, according to an embodiment of the present invention.

At 400, the VM relocation eligibility check request is received by the LGR facility managing the RD, and the hypervisors in the source and destination systems.

At 410, the determination is made whether the relocating VM is cryptographic-capable. If it is not, then at 430, the VM may relocate since it has no dependency on the cryptographic capabilities of the RDs.

If at 410, the VM is cryptographic-capable, then at 415 the effective characteristics of the relocating VM are compared to the actual characteristics of the destination system.

If at 420, the destination system does not provide a superset of the relocating VM's effective characteristics, then at 425, relocation is not allowed. This is because the relocation would force the relocating VM to lose capabilities through a downgrade.

If at 420, the destination system can provide at least the effective characteristics of the relocating VM, then at 430, relocation is allowed.

Figure 5A:
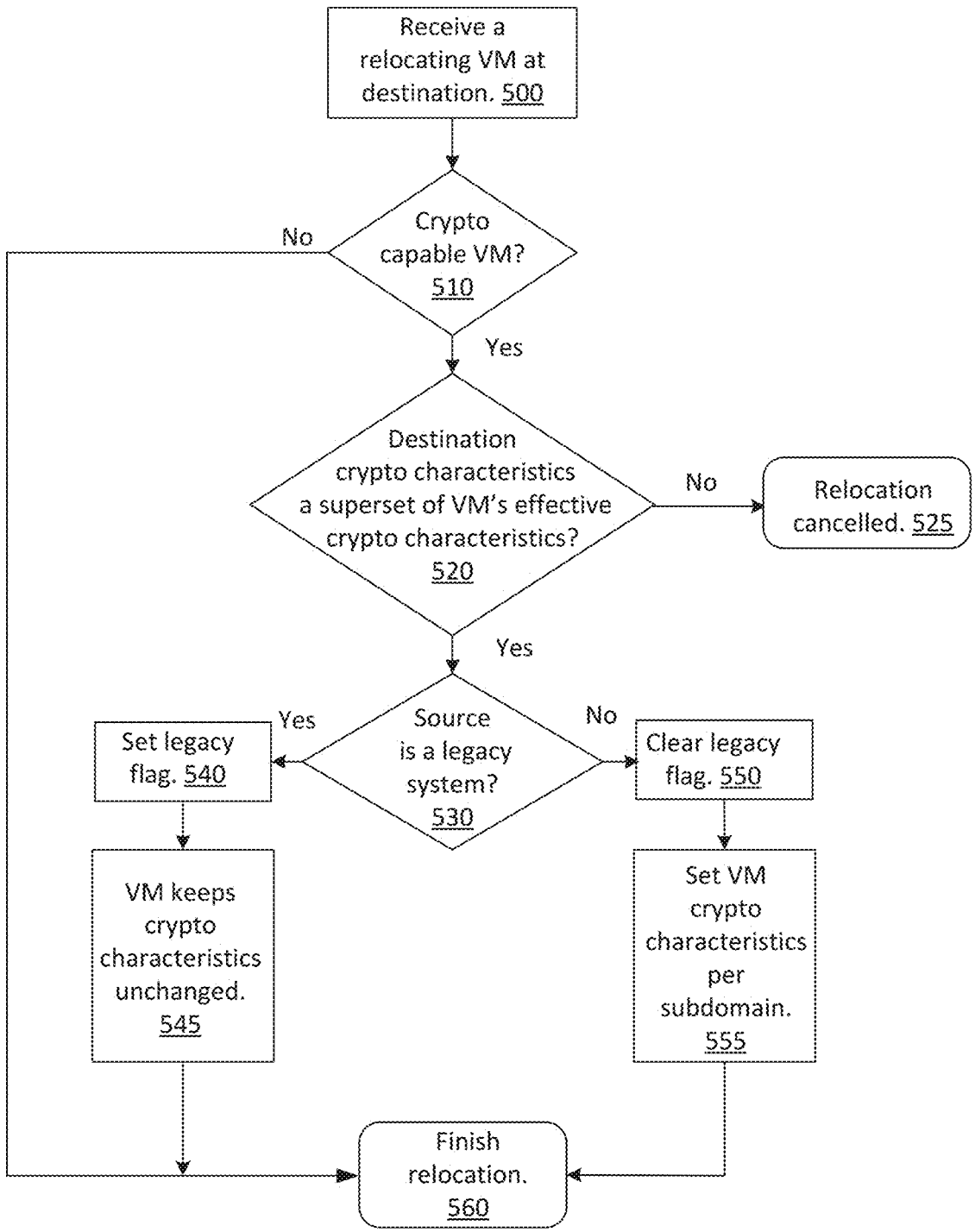
FIG. 5A illustrates a flow chart of a relocation of a VM, according to an embodiment of the present invention.

FIG. 5A illustrates a flow chart of a relocation of a VM, according to an embodiment of the present invention, allowing for optimal relocation from either a legacy system enforcing strict equality in cryptographic characteristics, or a newer system requiring only compatible characteristics.

At 500, the relocating VM is received by the hypervisor in the destination system.

At 510, the VM is inspected to determine whether it requires cryptographic capability. If not, then crypto characteristics need not be addressed, and the remainder of relocation can proceed at 560.

Returning to 510, if the VM requires cryptographic capability, then at 520, the LGR facility checks whether the cryptographic capabilities at the destination system are compatible with (i.e., a superset of) the VM's effective cryptographic characteristics. If not, then at 525, relocation is canceled to prevent the VM from losing capability. Returning to 520, if the destination's capabilities are compatible, then at 530, the LGR facility at the destination hypervisor determines the code level of the source hypervisor. If the source hypervisor is a legacy system, that is, an older code level that enforces strict equality of crypto characteristics, then at 540, a legacy indicator is set to record this, and at 545, the VM retains its effective crypto characteristics unchanged. Then at 560, the remainder of relocation proceeds.

Returning to 530, if the source system is not a legacy system but rather a newer system that implements more flexible crypto compatibility rules, then at 550, the legacy indicator is cleared, and at 555 the effective crypto characteristics of the VM are set according to the subdomain. Then at 560, the remainder of relocation proceeds.

Figure 5B:
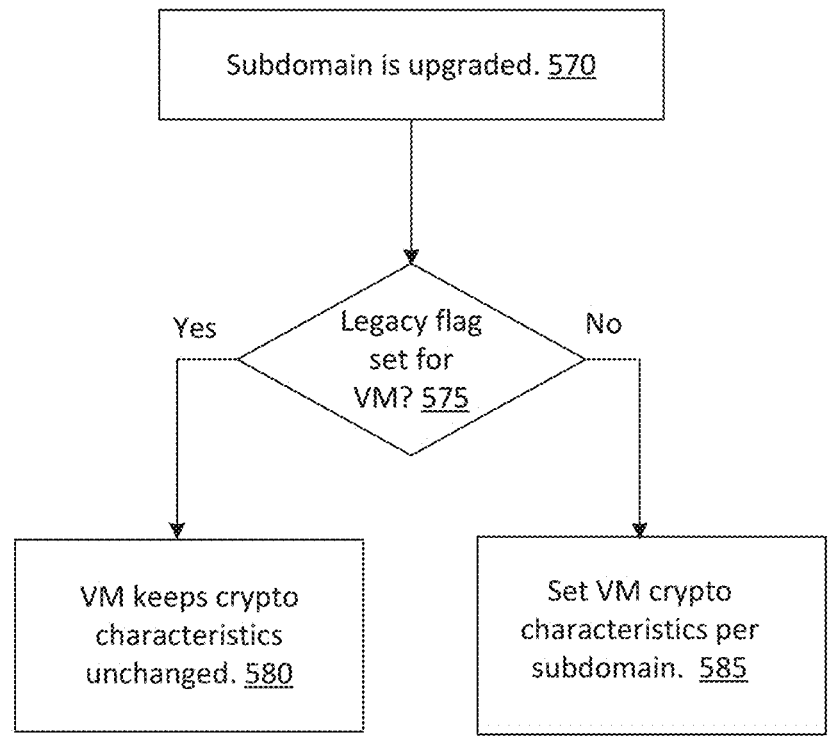
FIG. 5B illustrates the use of the legacy flag while the relocated VM executes on a system implementing an embodiment of the invention.

FIG. 5B illustrates the use of the legacy flag while the relocated guest executes on a system implementing an embodiment of the invention, so as to preserve the ability for the VM to relocate back to its prior source system.

At 570, an event occurs that causes the subdomain to which the VM is assigned to be upgraded. This event might be, for example, a dynamic upgrade to the underlying capabilities of a member system in the subdomain, improving the maximal common subset of cryptographic capabilities among the non-legacy systems in the subdomain. At 575, the legacy flag for a VM assigned to this subdomain is interrogated. If the legacy flag is set, then at 580, the VM retains its current effective cryptographic characteristics, ignoring the change to the subdomain's characteristics. If instead the legacy flag is not set, then at 585, the VM acquires the upgraded characteristics now available to the subdomain.

Thus, when the legacy attribute is assigned to a VM it prohibits upgrades to that VM's effective cryptographic characteristics. Such upgrades occur naturally through dynamic cryptographic configuration changes and relocation domain reconfigurations and may be afforded to other VMs not marked as having relocated from a legacy system. In this way the VM originating from a legacy system will retain the crypto characteristics it had when running on that legacy system. Such a VM will be able to relocate back because the strict eligibility criterion of legacy systems, requiring equality rather than merely compatibility, remains satisfied.

Figure 6:
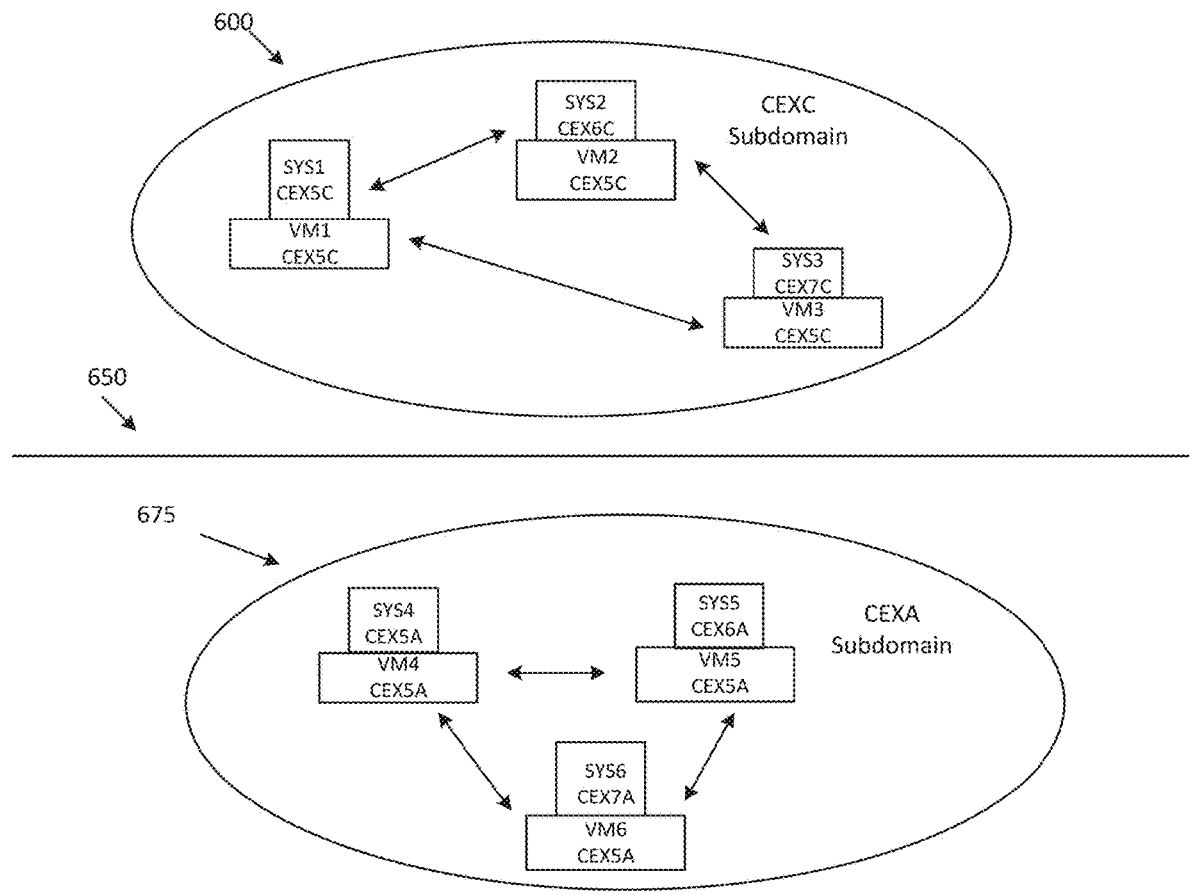
FIG. 6 illustrates a schematic diagram of the relocation of virtual machines between a plurality of hypervisors in an embodiment.

FIG. 6 illustrates a schematic diagram of the relocation of VMs among a plurality of hypervisors in a single RD in an embodiment. The CEXC subdomain 600 of the RD includes 3 systems (hypervisors), each having a version of a CEXC (CCA coprocessor) adapter. SYS1 has the CEXC adapter with the oldest version, CEX5C. SYS2 has a next higher level of adapter, CEX6C. SYS3 has the highest level of adapter, CEX7C. The set of hypervisors among which the VMs requiring CEXC cryptographic capabilities may relocate presents a maximal common subset of facilities in the CEXC subdomain of the RD. Therefore, VM1, VM2, and VM3 each are assigned the characteristics of the CEX5C adapter, even though their host systems may present a higher level of adapter. As a result, each VM may relocate freely within the CEXC subdomain of the RD.

A CEXA subdomain of the RD is shown as 675. The CEXA RD includes 3 systems (hypervisors), each having a version of a CEXA (Accelerator-based) adapter. SYS4 has the CEXA adapter with the oldest version, CEX5A. SYS5 has a next higher level of adapter, CEX6A. SYS6 has the highest level of adapter, CEX7A. The set of hypervisors among which the VMs may relocate presents a maximal common subset of facilities in the CEXA subdomain of the RD. Therefore, VM4, VM5, and VM6 each are assigned the characteristics of the CEX5A adapter, even though their host systems may present a higher level of adapter. As a result, each VM may relocate freely within the CEXA subdomain of the RD. But as boundary line 650 depicts, each subdomain includes only one configuration mode of CEX adapter. Therefore, the VMs requiring cryptographic capability are not free to relocate between the two subdomains. Non-cryptographic-capable VMs are not so restricted, and may freely relocate among the systems in both subdomains of the RD. Subdomains are only observable by cryptographic-capable VMs. Those that are not cryptographic-capable may relocate with the usual freedoms applied to relocation domains as described in prior art.

Figure 7:
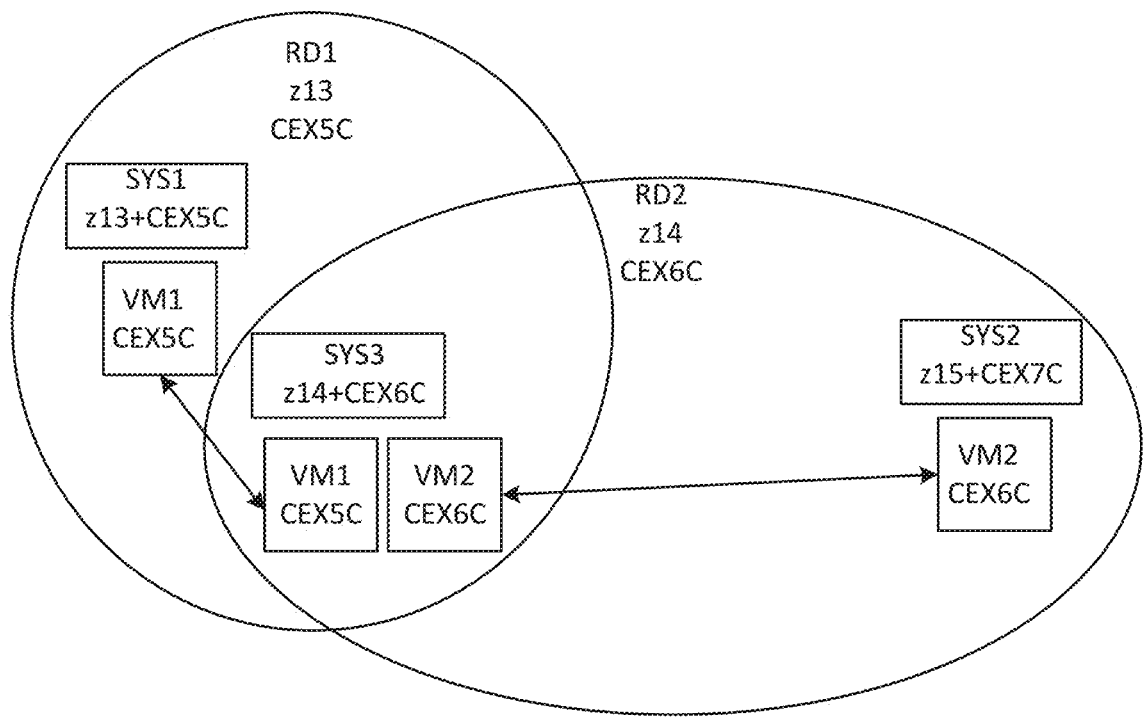
FIG. 7 illustrates a schematic diagram of different virtual cryptographic characteristics for different relocation domains.

FIG. 7 illustrates a schematic diagram of different virtual cryptographic characteristics for different relocation domains.

In FIG. 7, two RDs are shown. RD1 includes both a z13 and a z14 z/Architecture® processor. RD2 includes both a z14 and a z15 z/Architecture® processor. Each VM is assigned to a specific RD. A system may be a member of multiple RDs. Here, SYS3 is a member of both RD1 and RD2. Each VM is assigned to one RD. Here, VM1 is assigned to RD1, and VM2 is assigned to RD2. In this example, all systems in RD1 and RD2 have cryptographic devices of the same mode, CEXC; therefore, only the CEXC subdomain of each RD is relevant to this discussion.

The RD presents the maximal common subset of facilities that are available to a VM assigned there. SYS3 is a member of RD1 and RD2. Even though SYS3 provides the capabilities of CEX6C, in RD1, the maximal common subset is that provided by the CEX5C. VM1 is a member of RD1, and is therefore assigned the virtual cryptographic subset of the CEX5C, which is the common architecture of RD1. Similarly, SYS2 provides the capabilities of CEXSC, but as a member of RD2, SYS2 provides the capabilities of CEX6C, based on the membership of SYS3. Therefore, in RD2, the maximal common subset that is provided to a VM is the CEX6C. In this illustration, VM2 is a member of RD2, and is therefore assigned the virtual cryptographic subset of the CEX6C. VM1 and VM2 may relocate within their respective RDs. For example, VM1 may have been instantiated on SYS1 and relocated to SYS3, or vice versa.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method for dynamic relocation of virtual machines (VM) in a relocation domain, comprising:
   initializing a hypervisor in a subdomain of the relocation domain;
   retrieving a record of architecture characteristics for each hypervisor in the relocation domain;
   calculating a canonical architectural description (ARD) for each subdomain in the relocation domain;
   creating an effective adapter characteristic representation for each VM defined to the hypervisor;
   updating the record of architecture characteristics for each hypervisor in the relocation domain and;
   relocating the VM, wherein the VM having a cryptographic capability does not relocate to a hypervisor having a lesser subset of cryptographic characteristics in the cryptographic subdomain.

2. The method of claim 1, wherein the relocation domain includes at least a common cryptographic architecture mode (CCA) and an accelerator based cryptographic configuration.

3. The method of claim 2, wherein the VM without a cryptographic capability relocates to any hypervisor in the CCA subdomain or in the accelerator subdomain.

4. The method of claim 1, wherein the effective adapter characteristic representation is a maximal common subset of characteristics of the hypervisors in the subdomain of the relocation domain.

5. The method of claim 1, wherein the VM having a cryptographic configuration only relocates to hypervisors within the cryptographic subdomain having a same cryptographic configuration, wherein the VM having the cryptographic configuration does not freely relocate between cryptographic subdomains.

6. The method of claim 1, wherein the VM having cryptographic capability relocates to a hypervisor having a maximal set of cryptographic characteristics in the assigned cryptographic subdomain;
wherein the VM reverse transitions; and
wherein the effective cryptographic characteristics of the VM are unchanged.

7. A computer program product for dynamic relocation of VMs in a relocation domain, the computer program product comprising a non-transitory tangible storage device having program code embodied therewith, the program code executable by a processor of a computer to perform a method, the method comprising:
initializing a hypervisor in a subdomain of the relocation domain;
retrieving a record of architecture characteristics for each hypervisor in the relocation domain;
calculating a new canonical architectural description (ARD) for each subdomain in the relocation domain;
creating an effective adapter characteristic representation for each VM defined to the hypervisor;
updating the record of architecture characteristics for each hypervisor in the relocation domain and;
relocating the VM, wherein the VM having a cryptographic capability does not relocate to a hypervisor having a lesser subset of cryptographic characteristics in the cryptographic subdomain.

8. The computer program product of claim 7, wherein the relocation domain includes at least a common cryptographic architecture mode (CCA) and an accelerator based cryptographic configuration.

9. The computer program product of claim 8, wherein the VM without a cryptographic capability relocates to any hypervisor in the CCA subdomain or in the accelerator subdomain.

10. The computer program product of claim 7, wherein the effective adapter characteristic representation is a maximal common subset of cryptographic characteristics of the hypervisors in the cryptographic subdomain of the relocation domain.

11. The computer program product of claim 7, wherein the VM having a cryptographic configuration only relocates to hypervisors within the cryptographic subdomain having a same cryptographic configuration, wherein the VM having the cryptographic configuration does not freely relocate between cryptographic subdomains.

12. A computer system for dynamic relocation of virtual machines (VMs) in a relocation domain, comprising:
one or more processors;
a memory coupled to at least one of the processors;
a set of computer program instructions stored in the memory and executed by at least one of the processors in order to perform actions of:
initializing a hypervisor in a subdomain of the relocation domain;
retrieving a record of architecture characteristics for each hypervisor in the relocation domain;
calculating a new canonical architectural description (ARD) for each subdomain in the relocation domain;
creating an effective adapter characteristic representation for each virtual machine (VM) defined to the hypervisor; and
updating the record of architecture characteristics for each hypervisor in the relocation domain and;
relocating the VM, wherein the VM having a cryptographic capability does not relocate to a hypervisor having a lesser subset of cryptographic characteristics in the cryptographic subdomain.

13. The computer system of claim 12, wherein the relocation domain includes at least a common cryptographic architecture mode (CCA) and an accelerator based cryptographic configuration.

14. The computer system of claim 13, wherein the VM without a cryptographic capability relocates to any hypervisor in the CCA subdomain or in the Accelerator subdomain.

15. The computer system of claim 12, wherein the effective adapter characteristic representation is a maximal common subset of characteristics of the hypervisors in the subdomain of the relocation domain.

16. The computer system of claim 12, wherein the VM having a cryptographic configuration only relocates to hypervisors within the cryptographic subdomain having a same cryptographic configuration, wherein the VM having the cryptographic configuration does not freely relocate between cryptographic subdomains.

17. The computer system of claim 12, wherein the VM having cryptographic capability relocates to a hypervisor having a maximal set of cryptographic characteristics in the assigned cryptographic subdomain;
wherein the VM reverse transitions; and
wherein the effective cryptographic characteristics of the VM are unchanged.

* * * * *